United States Patent
Wu

(10) Patent No.: US 10,225,872 B2
(45) Date of Patent: Mar. 5, 2019

(54) DEVICE AND METHOD OF HANDLING DEVICE-TO-DEVICE COMMUNICATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 523 days.

(21) Appl. No.: 14/737,504

(22) Filed: Jun. 12, 2015

(65) Prior Publication Data

US 2015/0365991 A1 Dec. 17, 2015

Related U.S. Application Data

(60) Provisional application No. 62/012,993, filed on Jun. 17, 2014.

(51) Int. Cl.
*H04W 4/00* (2018.01)
*H04W 76/14* (2018.01)
*H04W 48/02* (2009.01)

(52) U.S. Cl.
CPC .......... *H04W 76/14* (2018.02); *H04W 48/02* (2013.01)

(58) Field of Classification Search
None
See application file for complete search history.

(56) References Cited

U.S. PATENT DOCUMENTS

2015/0036495 A1* 2/2015 Venkatachalam ............................ H04W 28/0215 370/235
2015/0327312 A1* 11/2015 Burbidge .............. H04W 72/14 370/329

OTHER PUBLICATIONS

3GPP TS 36.300 V12.1.0 (Mar. 2014) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
3GPP TR 36.843 V12.0.1 (Mar. 2014) Technical Report 3rd Generation Partnership Project; Technical Specification Group Radio Access Network; Study on LTE Device to Device Proximity Services; Radio Aspects (Release 12).
3GPP TS 24.301 V12.4.0 (Mar. 2014) Technical Specification 3rd Generation Partnership Project; Technical Specification Group Core Network and Terminals; Non-Access-Stratum (NAS) protocol for Evolved Packet System (EPS); Stage 3 (Release 12).

* cited by examiner

*Primary Examiner* — Zewdu A Beyen
(74) *Attorney, Agent, or Firm* — Winston Hsu

(57) ABSTRACT

A communication device for handling a device-to-device (D2D) communication comprises a storage unit for storing instructions and a processing means coupled to the storage unit. The storage unit is configured to execute the instructions stored in the storage unit. The instructions comprise receiving a barring in a signalling transmitted by a first base station; and bypassing the barring to initiate a procedure for the D2D communication to a second base station.

16 Claims, 3 Drawing Sheets

DEVICE AND METHOD OF HANDLING DEVICE-TO-DEVICE COMMUNICATION

CROSS REFERENCE TO RELATED APPLICATIONS

This application claims the benefit of U.S. Provisional Application No. 62/012,993, filed on Jun. 17, 2014 and incorporated herein by reference.

BACKGROUND OF THE INVENTION

1. Field of the Invention

The present invention is related to a communication device and a method used in a wireless communication system, and more particularly, to a communication device and a method of handling a device-to-device communication in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, uplink multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Device-to-device (D2D) communication may be realized, after an initialization (e.g., connection establishment and/or peer discovery) is performed (e.g., assisted by an eNB). Then, two UEs may communicate (e.g., transmitting and/or receiving packets) with each other directly according to the D2D communication, and the eNB does not need to forward the packets transmitted between the communication devices. According to the D2D communication, the UEs may communicate with each other via UL resources (e.g., UL subframes configured by the eNB). In general, the D2D communication may also be seen as a D2D service (i.e., proximity service (ProSe)). In addition, a D2D subframe, D2D transmission, D2D communication and D2D discovery can be termed as a sidelink subframe, sidelink transmission, sidelink communication and sidelink discovery, respectively.

However, there are some issues regarding the D2D communication in the prior art. In one example, the UEs (e.g., a first UE and a second UE) are out of coverage areas of eNBs, when the UEs communicate with each other according to the D2D communication, e.g., via a mode 2 resource allocation. When the first UE moves to a coverage area of an eNB, the first UE may initiate a tracking area update procedure to an evolved packet core (EPC) connected to the eNB. However, the first UE may not be able to initiate the tracking area update procedure, e.g., because an access barring for a mobile originated signaling is configured to the first UE, or a back-off timer is still running. The first UE cannot successfully register itself to a network (e.g., Mobility Management Entity (MME)) via the eNB, and consequently the first UE cannot be allocated with a mode 1 resource allocation. Hence, quality of the D2D communication cannot be improved. The abovementioned problem may also to the second UE, when the second UE enters a coverage area of an eNB.

Thus, how to solve improve quality of the D2D communication when one or more communication operations of the UE are barred is an important problem to be solved.

SUMMARY OF THE INVENTION

The present invention therefore provides a communication device and a method for handling a device-to-device communication to solve the abovementioned problem.

A communication device for handling a device-to-device (D2D) communication comprises a storage unit for storing instructions and a processing means coupled to the storage unit. The storage unit is configured to execute the instructions stored in the storage unit. The instructions comprise receiving a barring in a signalling transmitted by a first base station; and bypassing the barring to initiate a procedure for the D2D communication to a second base station.

A method for handling a device-to-device (D2D) communication for a communication device comprises receiving a barring in a signalling transmitted by a first base station; and bypassing the barring to initiate a procedure for the D2D communication to a second base station.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
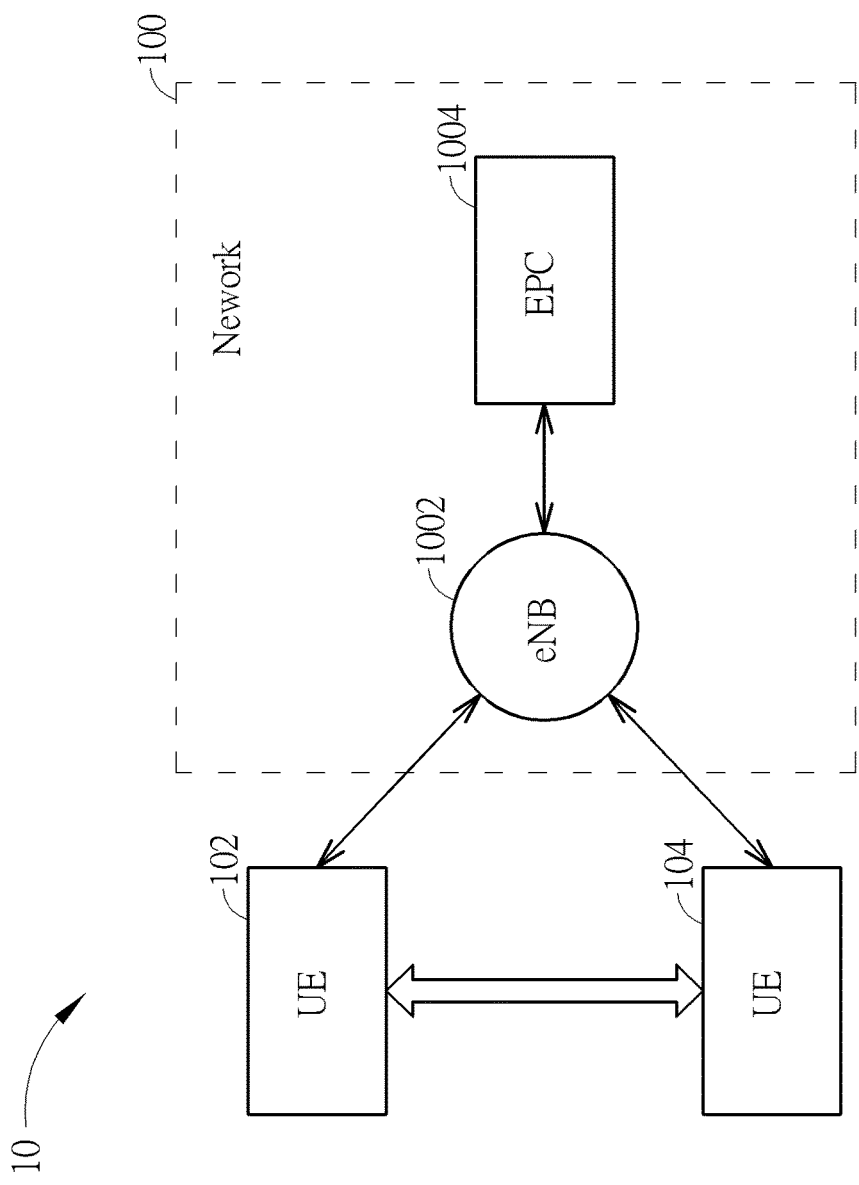
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network 100 and user equipments (UEs) 102 and 104. In FIG. 1, the network 100 and the UEs 102 and 104 are simply utilized for illustrating the structure of the wireless communication system 10. A UE may communicate with the network 100 according to a device-to-cellular (D2C) communication defined in a communication standard, e.g., the 3rd Generation Partnership Project (3GPP) standard. Practically, the network 100 can be a universal terrestrial radio access network (UTRAN) comprising at least one Node-B (NB) in a universal mobile telecommunications system (UMTS). In another example, the network 100 can be an evolved UTRAN (E-UTRAN) comprising at least one evolved NB (eNB) and/or at least one relay in along term evolution (LTE) system, a LTE-Advanced (LTE-A) system or an evolution of the LTE-A system. As an example, the network 100 includes an eNB 1002 connected to an evolved packet core (EPC) 1004 in FIG. 1.

Furthermore, the network 100 can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network 100 receives information transmitted by a UE (e.g., the UE 102 and/or the UE 104), the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A UE (e.g., the UE 102 and/or the UE 104) can be a low cost device (e.g., machine type communication (MTC) device), a device-to-device (D2D) device, a mobile phone, a laptop, a tablet computer, an electronic book, a portable computer system, or combination thereof. In addition, for the D2C communication, the network 100 and the UE can be seen as a transmitter or a receiver according to direction (i.e., transmission direction), e.g., for an uplink (UL), the UE is the transmitter and the network 100 is the receiver, and for a downlink (DL), the network 100 is the transmitter and the UE is the receiver.

In addition, the UEs 102 and 104 may communicate with each other directly, after an initialization (e.g., connection establishment and/or peer discovery) is performed. For example, the initialization may be assisted by the network 100. That is, the UEs 102 and 104 may communicate (e.g., transmit and/or receive signals/packets) with each other according to a D2D communication defined in a communication standard, e.g., 3GPP standard. The UEs 102 and 104 may communicate with each other via UL resources (e.g., UL subframes or UL carriers) determined according to frequency-division duplexing (FDD) configuration and/or time-division duplexing (TDD) configurations. In one example, the UE 102 may communicate with the UE 104 and the network 100 simultaneously, i.e., both the D2D communication and the D2C communication are realized at the same time.

Figure 2:
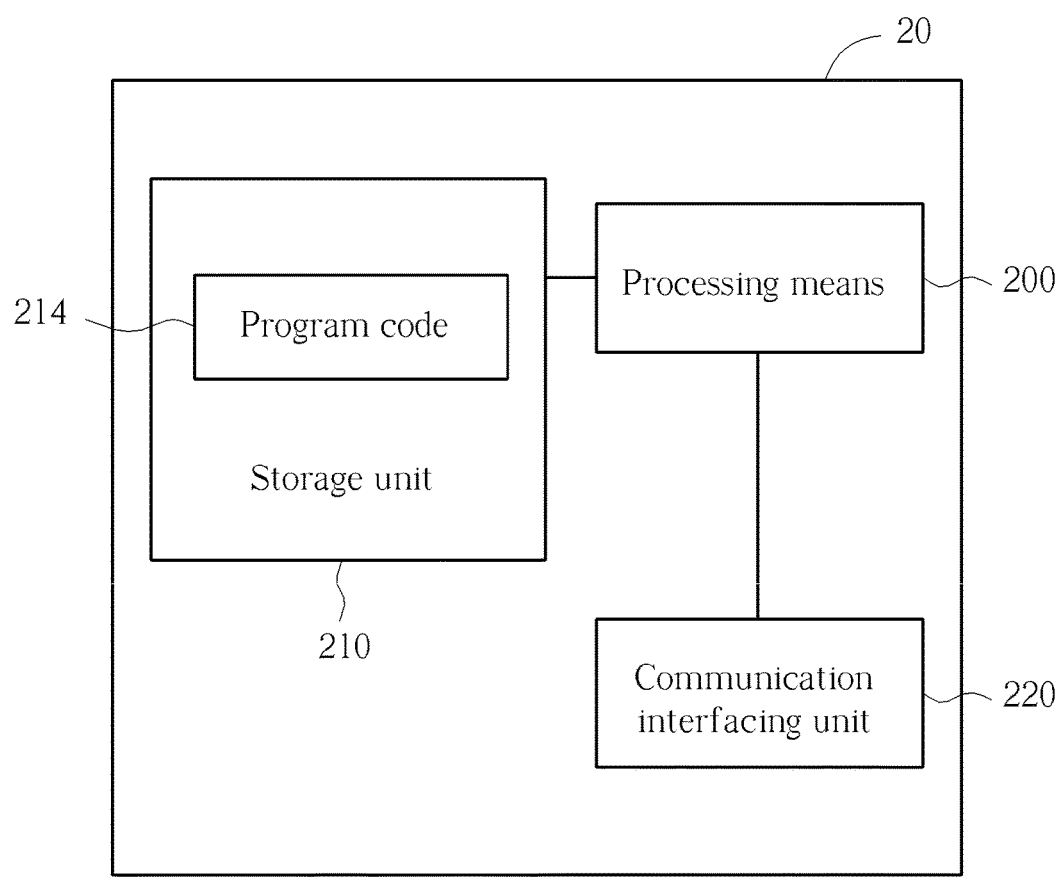
FIG. 2 is a schematic diagram of a communication device according to an example of the present invention.

FIG. 2 is a schematic diagram of a communication device 20 according to an example of the present invention. The communication device 20 may be used for realizing the network 100, the UE 102 and/or the UE 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
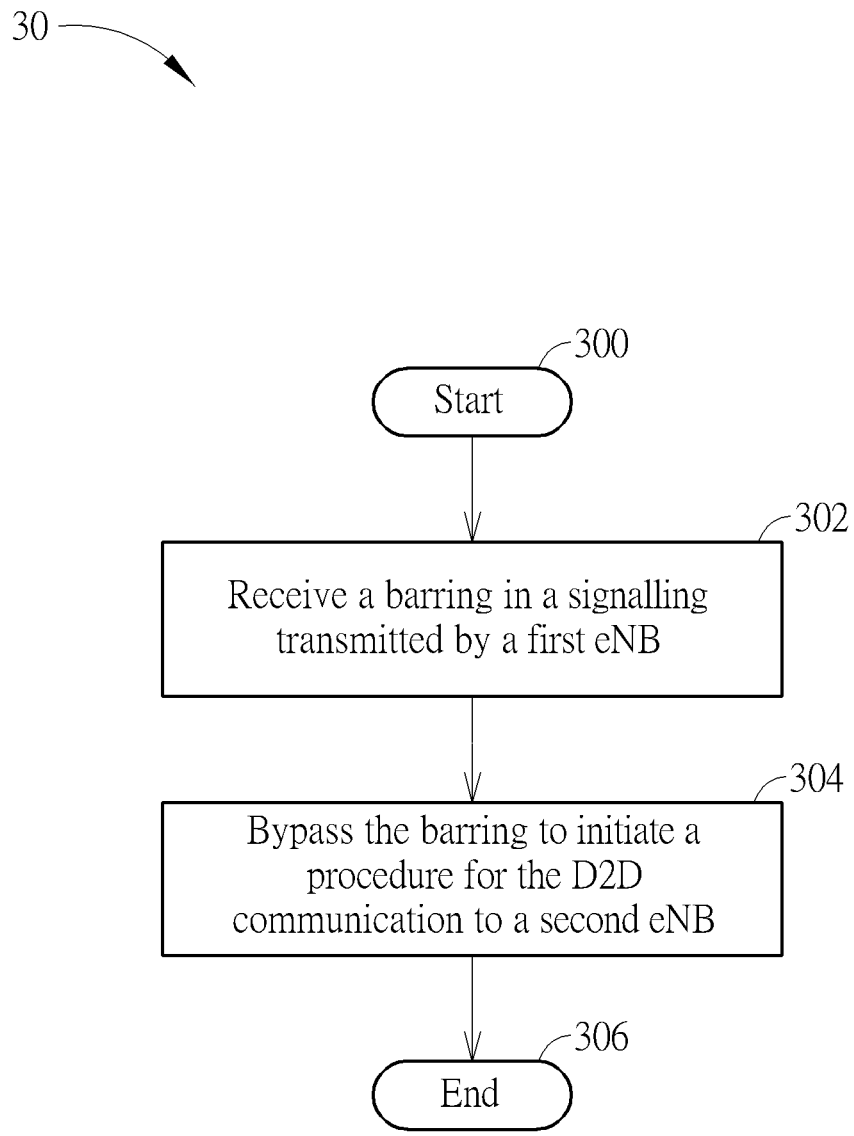
FIG. 3 is a flowchart of a process according to an example of the present invention.

FIG. 3 is a flowchart of a process 30 according to an example of the present invention. The process 30 may be utilized in the UE 102 (or the UE 102) shown in FIG. 1, to handle a D2D communication. The process 30 may be compiled into the program code 214 and includes the following steps:

Step 300: Start.

Step 302: Receive a barring in a signalling transmitted by a first eNB.

Step 304: Bypass the barring to initiate a procedure for the D2D communication to a second eNB.

Step 306: End.

According to the process 30, the UE 102 may receive a barring in a signalling transmitted by a first eNB. The UE 100 may initiate to communicate with another UE (e.g., the UE 104) according to the D2D communication. Then, the UE 102 may bypass the barring to initiate a procedure for the D2D communication to a second eNB (e.g., the eNB 1002). That is, the UE 102 may be barred from performing one or more communication operations, e.g., transmissions and/or transmissions. According to the prior art, the UE 102 is not allowed to perform the procedure which in general includes one or more communication operations to the second eNB. In contrast, according to the process 30, the UE 102 initiates the procedure regardless of the barring. That is, a priority of the procedure for the D2D communication is higher than a priority of the barring. Thus, throughout of the UE 102 can be improved after the initiating the procedure to the eNB 1002.

In one example, the UE 102 may be communicating with the UE 104 via a mode 2 resource allocation according to the D2D communication. Quality of communication via the mode 2 resource allocation is in general worse than quality of communication via a mode 1 resource allocation. However, the mode 1 resource allocation cannot be used by the UE 102 arbitrarily, but should be scheduled by the eNB 1002 to the UE 102 after a specific procedure is performed. According to the process 30, the UE 102 may initiate the procedure for obtaining the mode 1 resource allocation (e.g., from the eNB 1002) for the D2D communication. In another example, the UE 102 may initiate the procedure for activating the D2D communication with the UE 104.

The signaling in the process 30 is not limited to any specific signaling. For example, the signalling may be a Non-Access Stratum (NAS) signalling or a radio resource control (RRC) signalling. That is, the UE 102 may be barred for one or more communications by the barring in the NAS signalling or the RRC signalling. In addition, the barring may be an access barring configured by ac-BarringForMO-Data, ac-BarringForMO-Signalling, waitTime or extendedWaitTime in the RRC signalling. In another example, the barring may be an access barring configured by a back-off timer in the NAS signalling.

The procedure in the process 30 is not limited to any specific procedure. For example, the procedure may include an RRC procedure. Further, the RRC procedure may include an RRC establishment procedure. In one example, the procedure may include a NAS procedure. Further, the NAS procedure may include a service request procedure, an attach procedure, a tracking area update procedure or a new procedure dedicated for requesting the D2D communication. In other words, the UE 102 may perform any of the abovementioned procedures regardless of the barring, to obtain the mode 1 resource allocation for the D2D communication.

In the process 30, the UE 102 is in a coverage area of the first eNB. The UE 102 may leave the coverage area, e.g., after a certain time interval. Then, the UE 102 may go to a coverage area of the second eNB (e.g., the eNB 1002), and tries to initiate the procedure. That is, the UE 102 leaves the coverage area of the first eNB, and enters the coverage area of the second eNB (e.g., after a while). In short, the barring may be bypassed to initiate the procedure under a condition that the UE 102 enters a coverage area of the second BS. The UE may receive the barring from the second eNB. The first eNB and the second eNB in may be the same eNB or different eNBs. That is, the UE 102 may go back to the coverage area of the same eNB, or go to the coverage area of a different eNB. In the latter case, the UE 102 may perform a tracking area update procedure via the second eNB for the D2D communication with the UE 104.

In one example, the UE 102 may stop initiating another procedure for a non-D2D communication according to the barring. That is, the UE 102 violates the barring when the procedure is initiated for the D2D communication, and follows the barring when the procedure is not initiated for the D2D communication. The non-D2D communication may include communication such as voice call, short message service, or internet data call via which data traverse the network. In one example, the UE 102 may continue to communicate with the UE 104 according to the D2D communication under a condition that the procedure is initiated for the D2D communication. That is, the communication (i.e., D2D communication) between the UE 102 and the UE 104 is not stopped, when initiating the procedure. In another example, the UE 102 may stop communicating with the UE 104 according to the D2D communication under a condition that the procedure is initiated for the D2D communication. That is, the communication (i.e., D2D communication) between the UE 102 and the UE 104 is suspended, when initiating the procedure. After the procedure is completed, the communication between the UE 102 and the UE 104 may be resumed.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module (s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device and a method for improving quality of communications between UEs which are out of coverage areas of eNBs, when one of the UEs enters a coverage area of an eNB. According to the present invention, the UE can bypass a barring configured to the UE, to initiating a procedure for the D2D communication. Thus, a mode 1 resource allocation may be configured to the UE from the eNB, after the procedure is performed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a device-to-device (D2D) communication, comprising:
   a storage unit for storing instructions of:
   receiving a barring in a signalling transmitted by a first base station, wherein the barring bars the communication device from performing at least one communication operation; and
   bypassing the barring to initiate a procedure for the D2D communication to a second base station, wherein the procedure is initiated for obtaining a mode 1 resource allocation for the D2D communication or for activating the D2D communication with another communication device;
   wherein the barring is an access barring configured by access barring for mobile originating data, access barring for mobile originating signalling, waitTime or extendedWaitTime in the RRC signaling, or the barring is an access barring configured by a back-off timer in the NAS signalling; and
   a processing means, coupled to the storage unit, configured to execute the instructions stored in the storage unit.

2. The communication device of claim 1, wherein the communication device communicates with another communication device via a mode 2 resource allocation according to the D2D communication.

3. The communication device of claim 1, wherein the signalling is a Non-Access Stratum (NAS) signalling or a radio resource control (RRC) signalling.

4. The communication device of claim 1, wherein the procedure comprises an RRC procedure.

5. The communication device of claim 4, wherein the RRC procedure comprises an RRC establishment procedure.

6. The communication device of claim 1, wherein the procedure comprises a NAS procedure.

7. The communication device of claim 5, wherein the NAS procedure comprises a service request procedure, an attach procedure, a tracking area update procedure or a new procedure dedicated for requesting the D2D communication.

8. The communication device of claim 1, wherein the first base station and the second base station are the same base station.

9. The communication device of claim 1, wherein the instructions further comprise:
stopping initiating another procedure for a non-D2D communication according to the barring.

10. The communication device of claim 1, wherein the barring is bypassed to initiate the procedure under a condition that the communication device enters a coverage area of the second base station.

11. The communication device of claim 1, wherein the instructions further comprise:
continuing to communicate with another communication device according to the D2D communication under a condition that the procedure is initiated for the D2D communication.

12. The communication device of claim 1, wherein the instructions further comprise:
stopping communicating with another communication device according to the D2D communication under a condition that the procedure is initiated for the D2D communication.

13. A method of handling a device-to-device (D2D) communication for a communication device, comprising:

receiving a barring in a signalling transmitted by a first base station, wherein the barring bars the communication device from performing at least one communication operation; and bypassing the barring to initiate a procedure for the D2D communication to a second base station, wherein the procedure is initiated for obtaining a mode 1 resource allocation for the D2D communication or for activating the D2D communication with another communication device;

wherein the barring is an access barring configured by access barring for mobile originating data, access barring for mobile originating signalling, waitTime or extendedWaitTime in the RRC signaling, or the barring is an access barring configured by a back-off timer in the NAS signalling.

14. The method of claim 13, wherein the communication device communicates with another communication device via a mode 2 resource allocation according to the D2D communication.

15. The method of claim 13, wherein the signalling is a Non-Access Stratum (NAS) signalling or a radio resource control (RRC) signalling.

16. The method of claim 13, wherein the procedure comprises an RRC procedure or a NAS procedure.

* * * * *